United States Patent
Wynn et al.

(10) Patent No.: US 6,667,751 B1
(45) Date of Patent: Dec. 23, 2003

(54) LINEAR WEB BROWSER HISTORY VIEWER

(75) Inventors: Allen C. Wynn, Round Rock, TX (US); Cristi N. Ullmann, Austin, TX (US); Michael W. Brown, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 09/615,770

(22) Filed: Jul. 13, 2000

(51) Int. Cl.$^7$ ................................................. G09G 5/00
(52) U.S. Cl. ........................ 345/833; 345/760; 345/974
(58) Field of Search ............................... 345/853–855, 345/841, 810, 760, 833, 974

(56) References Cited

U.S. PATENT DOCUMENTS

| | | | |
|---|---|---|---|
| 5,813,014 A | | 9/1998 | Gustman ..................... 707/103 |
| 5,937,163 A | * | 8/1999 | Lee et al. .................... 709/218 |
| 5,954,798 A | | 9/1999 | Shelton et al. ............... 709/224 |
| 5,974,572 A | | 10/1999 | Weinberg et al. ............. 714/47 |
| 6,012,093 A | | 1/2000 | Maddalozzo, Jr. et al. . 709/223 |
| 6,243,091 B1 | * | 6/2001 | Berstis ........................ 345/839 |
| 6,366,303 B1 | * | 4/2002 | Venolia ....................... 345/856 |

OTHER PUBLICATIONS

Screen Dumps of Microsoft NT 5.0 Explorer (pp. 1, 1999).*

* cited by examiner

*Primary Examiner*—Kristine Kincaid
*Assistant Examiner*—Le V Nguyen
(74) *Attorney, Agent, or Firm*—Robert H. Frantz; David A. Mims, Jr.

(57) ABSTRACT

An enhanced web browser includes a visual history browser which allows recording of browsing sessions and visual replay or review of browsing sessions. As web sites are visited during a normal browsing session, images of the pages viewed are rendered and stored in the system's memory, and are keyed to entries in the web browser's history log. When the web browser user selects the visual history review control such as a graduated slider control, he or she may move the control forward or backward "in time" as the rendered images are displayed in a viewing window, along with optional information such as the originating web site for each address. The user may stop the control at a position in history, and select to re-point the browser to the web address selected from the history file. Thus, the user may visually browse back and forth through the history of web browser until he or she finds the page desired, and then jump to that page on the web.

63 Claims, 13 Drawing Sheets

LINEAR WEB BROWSER HISTORY VIEWER

CROSS-REFERENCE TO RELATED APPLICATIONS (CLAIMING BENEFIT UNDER 35 U.S.C. 120)

This application is related to the following U.S. applications (to be amended to include serial number when they have been assigned), all of which are commonly assigned:

| Ser. No. | Docket Number | Filed by: | Filed on: |
|---|---|---|---|
| 09/579,257 | AUS000196US1 | Allen C. Wynn, et al. | May 25, 2000 |
| 09/578,749 | AUS000197US1 | Allen C. Wynn, et al. | May 25, 2000 |
| 09/578,748 | AUS000201US1 | Cristi N. Ullmann, et al. | May 25, 2000 |
| 09/615,771 | AUS000203US1 | Cristi N. Ullmann, et al. | Jul. 13, 2000 |

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The following related applications are incorporated herein by reference in their entirety, including drawings, and hereby are made a part of this application:

| Ser. No. | Docket Number | Filed by: | Filed on: |
|---|---|---|---|
| 09/579,257 | AUS000196US1 | Allen C. Wynn, et al. | May 25, 2000 |
| 09/578,749 | AUS000197US1 | Allen C. Wynn, et al. | May 25, 2000 |
| 09/578,748 | AUS000201US1 | Cristi N. Ullmann, et al. | May 25, 2000 |
| 09/615,771 | AUS000203US1 | Cristi N. Ullmann, et al. | Jul. 13, 2000 |

BACKGROUND OF THE INVENTION

1. Field of the Invention

This invention pertains to the arts of web browser graphical user interface technology and web browser link history management. In particular, this invention relates to methods and systems for web browsers which allow the user to control the visual display of histories of previous web browsing sessions.

2. Description of the Related Art

The Internet and the World Wide Web have become critical, integral parts of commercial operations, personal lives, and the education process. At the heart of the Internet's success and wide spread acceptance is Internet browser technology and Internet server technology. An Internet server contains content which is available to systems and browsers which have Internet connectivity. Web browser or "client" computers may request documents from web addresses, to which appropriate web servers respond by transmitting one or more web documents, image or graphics files, forms, audio clips, etc. The most common protocol for transmission of web documents and contents from servers to browsers is Hyper Text Transmission Protocol ("HTTP"), and the most common web browser content includes Hyper Text Markup Language ("HTML") pages, Common Gateway Interface ("CGI") forms and pages, and Adobe's Portable Document Format ("PDF") pages. The most common graphic image and audio recording file formats found on the web today include Graphics Interchange Format ("GIF") and Joint Photographic Experts Group ("JPEG") graphics, moving video clips or segments such as Microsoft's Audio Video Interleave ("AVI") and Apple's QuickTime, and audio clips such as "WAV" files.

FIG. 1 shows the fundamental client-server arrangement of Internet and intranet communications. A client browser computer (1) is provided with Internet access (2) to the World Wide Web (3) through common means such as a dial-up telephone line and modem, cable modem, or local area network ("LAN"). The web browser computer (1) is also provided with appropriate web browsing software, such as Netscape's Navigator or Microsoft's Explorer. A web server computer (5) is likewise provided with Internet access (4) to the World Wide Web (3) using similar means, or higher-bandwidth means such as T1 and T3 data lines, and a web server suite of software. Alternatively, client and servers may be interconnected via an Intranet (6), such as a corporate LAN. These arrangements are well known within the art.

HTML, PDF and other web documents provide "hyperlinks" within the document, which allow a user to select another document or web site to view. Hyperlinks are specially marked text or areas in the document which when selected by the user commands the browser software to retrieve or fetch the indicated document.
For example, the text <A HREF="http://www.patents.ibm.com">VIEW PATENTS</A> when embedded into an HTML document will produce a specially marked or highlighted string of text in the web browser window which simply reads "VIEW PATENTS". Most commonly, this text will appear in underlined blue text, but the HTML document may specify alternate display characteristics for hyperlirks, as well as the web browser may have options for the display of hyperlinks. If the web browser user selects the hyperlink, such as clicking on the hyperlink using a mouse, the web browser will request the base document from web address www.patents.ibm.com using HTTP commands. The appropriate server for this web address will respond to the request by transmitting a web document, such as index.htm, to the requesting web browser.

Ordinarily, when the user selects a plain hyperlink, the current page being displayed in the web broswer's graphical user interface ("GUI") window disappears and the newly received page is displayed. If the parent page is an index, for example the IBM web site www.patents.ibm.com, and the user wishes to visit each descending link (e.g. read the document with tips on how to use the site), then the parent or index page disappears and the new page is displayed (such as the help page). The user must click the browser's "back" button to return to displaying the parent page if desired.

FIG. 2 shows an example partial "site map" for a typical web site. A base document (21), or "home page", is transmitted by the hosting web server to a requesting web browser using HTTP whenever a web browser "points" to a plain web address without a file specification, such as www.corp.com. In FIG. 2, an example of a base HTML document "index.htm" includes four hyperlinks. If the user selects or clicks on the displayed link for "help", the file "help.htm" is transmitted by the web server to the browser. In the web browser GUI window, the display of "index.htm" (21) is replaced with a display of "help.htm" (22). The user can further select a hyperlink in "help.htm" (22), such as "Product A", which will cause the web browser to transmit the file "helpA.htm" (23). This can continue many layers deep, and does not have to be organized as a simple tree structure, as shown, because hyperlinks can refer to files on other web addresses, to other parent files, etc.

FIG. 3 shows an example of a web browser graphical user interface ("GUI") display on a browser computer. On a portion (30) of a the user's browser computer screen, a web browser (31), such as Netscape's Navigator, is running in its own window. In this example, the browser is currently pointed to the top or home page of the example web site, as indicated in the location bar (34). The web page "index.htm" is configured to split the GUI display into three frames. The upper frame (32) is being used to display a general banner, the left frame (33) is being used to display a list of hyperlinks from the top page (or navigation bar), and the right-bottom frame (35) is displaying the contents of the currently selected page. The top of the web browser display includes a row of control icons, including a "back" button (36) and a "forward" button (37). Additionally, a domain history button (38), such as the location bar history drop-down list in Navigator, is provided.

Most web browser software, such as Microsoft's Internet Explorer and Netscape's Navigator, maintains a history log of visited web sites, domains, subdomains, subdirectories, and filenames. The full history log records the fully qualified path and filename of each file or page viewed and the time it was viewed. The history log can usually be viewed in its entirety by a web browser user, such as by selecting COMMUNICATOR-TOOLS-HISTORY in Netscape's Navigator. A user can usually select certain preferences for the sorting and retention of the information in the history log, such as maximum time a record is retained, and how to show the information sorted by document title, location, date viewed (chronologically or reverse-chronologically), alphabetically, etc. By viewing the fill sorted history log, a user may select a single page or location to visit again, but may have difficulty determining which page he or she wants to visit due to the sometimes cryptic nature of names used in web pages, web site path names and structures.

Thus, currently available browsers provide for some built-in navigation functions using the history log. The "back" button (36) shows the previous page, and the "forward" button shows the next page (if the "back" button has been used), assuming a tree-like structure of a web site. Sometimes, a user may descend multiple layers into a web site in such a way that the "back" button must be pressed many times to return to this "main" or top level page. Selecting the back or forward button causes the browser software to access the history log, sort by top level domain, and automatically re-point the browser to the previous or next page. This is useful for navigating a single web site, but is problematic for navigation based on a history which does not fit the pattern of traversing a tree-like organization within a website, such as following links of a search result from a search engine.

In Netscape's Navigator, another historical navigation tool is available from the location bar history drop down button (38), which, when selected, provides a list of recently visited top-level domains only. This is produced by filtering the entire history log for top level domain addresses (addresses which do not include subdirectories in their paths), sorting them for the most recently visited, and presenting a limited number of them. This is useful for re-visiting top-level domains or web sites which were recently visited. However, many users need to access particular information which he or she found as the result of many selections and moves within a particular web site, and this tool only takes them back to the top of the web site previously visited. Thus, he or she may then have to repeat the manual "hunting" process within that web site to find the information the user previously viewed.

Another browsing session pattern is common among web browser users which does not resemble following links in a tree-like manner. A user may actually choose links which take him across multiple web sites, and to random, seemingly unrelated points within several web sites. For example, a browsing session starting with a visit to a search engine starts with a tree-like pattern of visitation, but quickly turns into accesses to multiple pages from multiple web sites. Consider the following hypothetical web browsing session in which a web browser user wishes to find information about upcoming jazz concerts in the city of Austin, Tex. The user may point the web browser to a popular web search engine's home page by entering an appropriate universal resource locator ("URL") in the location bar (34). This retrieves and displays the search engine's home page (40), as shown in FIG. 4, and adds this address to the history log. The user then enters some keywords into a form provided by the search engine, and selects a button (41) to initiate the search. This causes the search engine to perform the indicated search, and to transmit a results page (50) which is displayed in the web browser's window, as shown in FIG. 5. The web browser adds the address of the results page to the history log.

The results page, such as the example shown in FIG. 5, includes multiple hyperlinks (51) to indexed pages on other web sites, and often graphical images which include hyperlinks, such as banner advertisements (52). In this hypothetical session, the user first selects the banner ad (52), which causes the web browser to select the document located at the hyperlink "austin.searchcity.com", which leads to a home page for yet another search engine, as shown in FIG. 6, and causes the web address "austin.searchcity.com" to be added to the history log. The user was hoping for direct information about jazz concerts, not another search engine, so the user selects the BACK button (36), to return to the results page from the first search engine, as shown in FIG. 5. Another entry for this visit to the results page is made by the web browser software in the history log. The user then selects a hyperlink (53) that appears to lead to more desirable information, and causes the document located at "www.wildaboutmusic.com/jazzy1/schedules.html" to be transmitted to the web browser and displayed. This address is also added to the history log. The user in this hypothetical case is satisfied with this "hit", and may browse further into this web site for more information, and resuming a more tree-like browsing pattern. TABLE 1 shows the entries in the history log made for this short session.

TABLE 1

Example Session History (a) http://www.wildaboutmusic.com/music/jazz1/schedules.html, 1:04 PM, TITLE = "K-Jazz93.3 Jazz Safari Concert Schedules"
(b) http://www.searchengine.com/srch/?lpv=1&loc=searchhp&query= jazz+concerts+austin&x=34&y=8; 1:03 PM, TITLE = "Search for "jazz concerts austin"

TABLE 1-continued

Example Session History (c) http://austin.searchcity.com/?csad=lycadddsw, 1:02 PM, TITLE= "CitySearch:austin"
(d) http://www.searchengine.com/srch/?lpv=1&loc=searchhp&query= jazz+concerts+austin&x=34&y=8; 1:01 PM, TITLE = "Search for "jazz concerts austin"
(e) http://www.searchengine.com/, 1:00 PM, TITLE="SearchEngine"

The partial history log shown in TABLE 1 represents the hypothetical session and sequence of visits (e, d, c, b, a) made during the session, presented in reverse chronological (most recent to least recent) order. Each entry also includes the document title, and the time of the visit, which allows the web browser software to sort the data by other user preferences such as by title, date, etc. A few days later, if a user wanted to retrace his or her steps to see the same concert schedule, he may open the history log, and search for these 5 entries among the literally hundreds of entries in the history log. He or she could possibly access the top levels of each of these web sites using the location history drop-down list, assuming too much time has not passed since the original visit. But, even so, only the top level of "www-.wildaboutmusic.com" would be available, requiring the user to navigate the entire web site to find the desired document which is buried at "/jazzy1/schedules.html".

It is readily apparent that using the BACK and FORWARD buttons is only useful in navigating recently browsed tree-like web structures. And, it is also apparent that using the location bar drop down list or the full history log is of limited usefulness. As more and more information is made available on the web, some of it well organized and some not, more web browser users will be using the Internet for everyday information retrieval. Thus, the current historical navigational tools available in the art will not be sufficient to allow efficient re-visitation to previously viewed web sites and documents.

Therefore, there is a need in the art for an improved historical navigational tool for web browsing. There is a need for this tool to allow visual retracing of previously-visited web sites and documents, thus providing visual stimulation to the user of the contents of the previously viewed documents and allowing a more direct selection of a site or address to revisit.

BRIEF DESCRIPTION OF THE DRAWINGS

The following detailed description when taken in conjunction with the figures presented herein present a complete description of the present invention.

SUMMARY OF THE INVENTION

Figure 1:
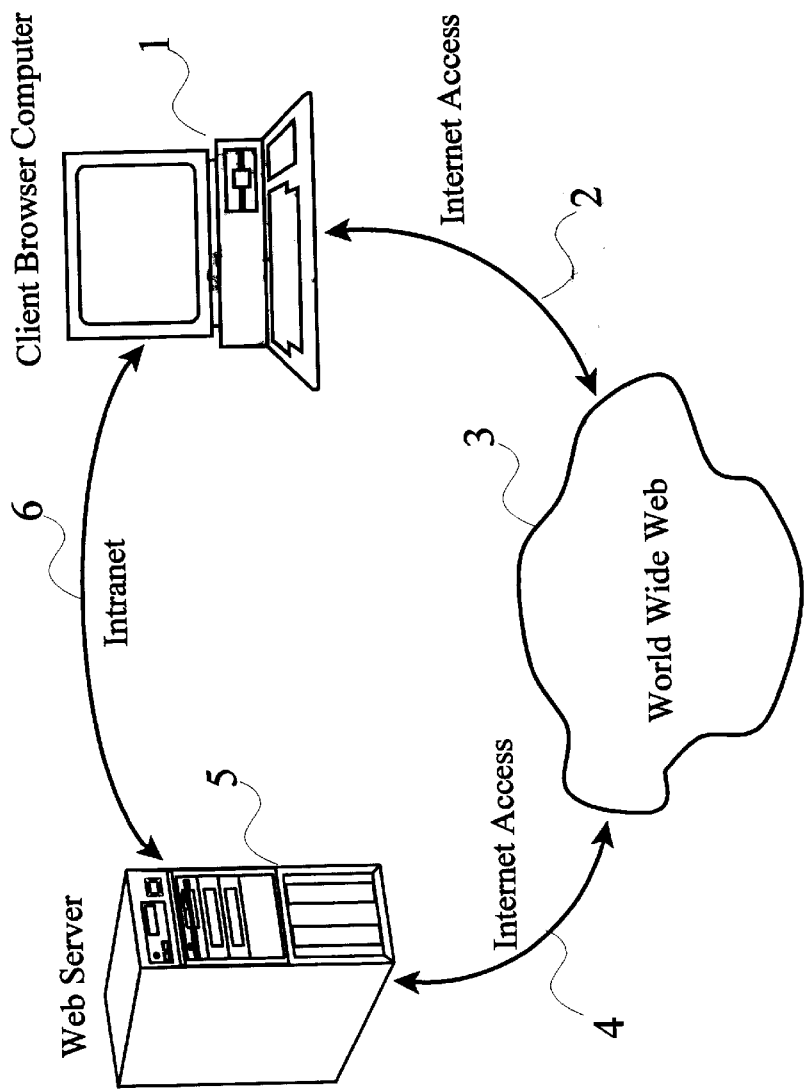
FIG. 1 shows the prior art arrangement of web browser systems, web server systems, the Internet and intranets.
Figure 2:
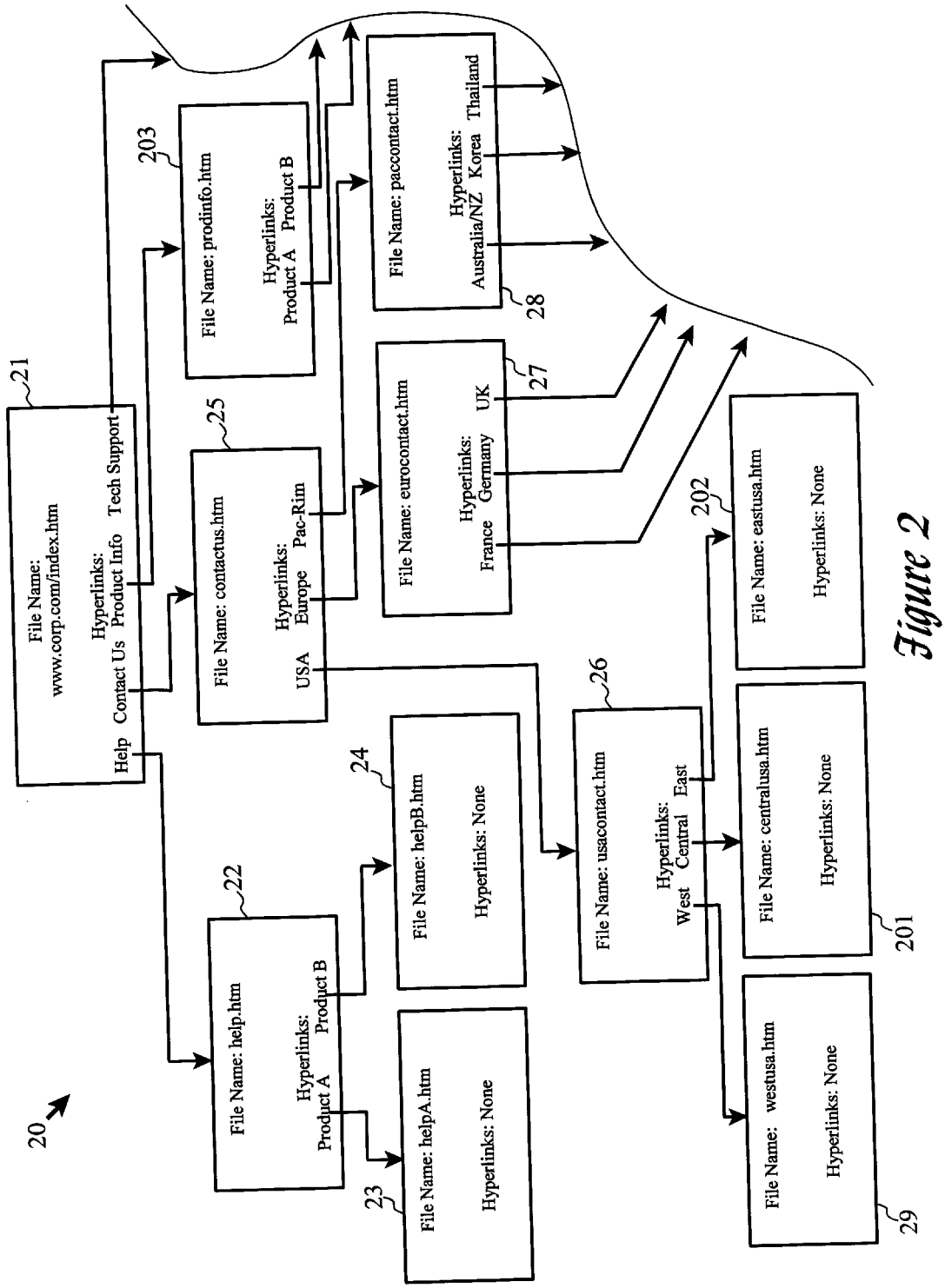
FIG. 2 presents an example web site map, with hyperlink relationships indicated.
Figure 3:
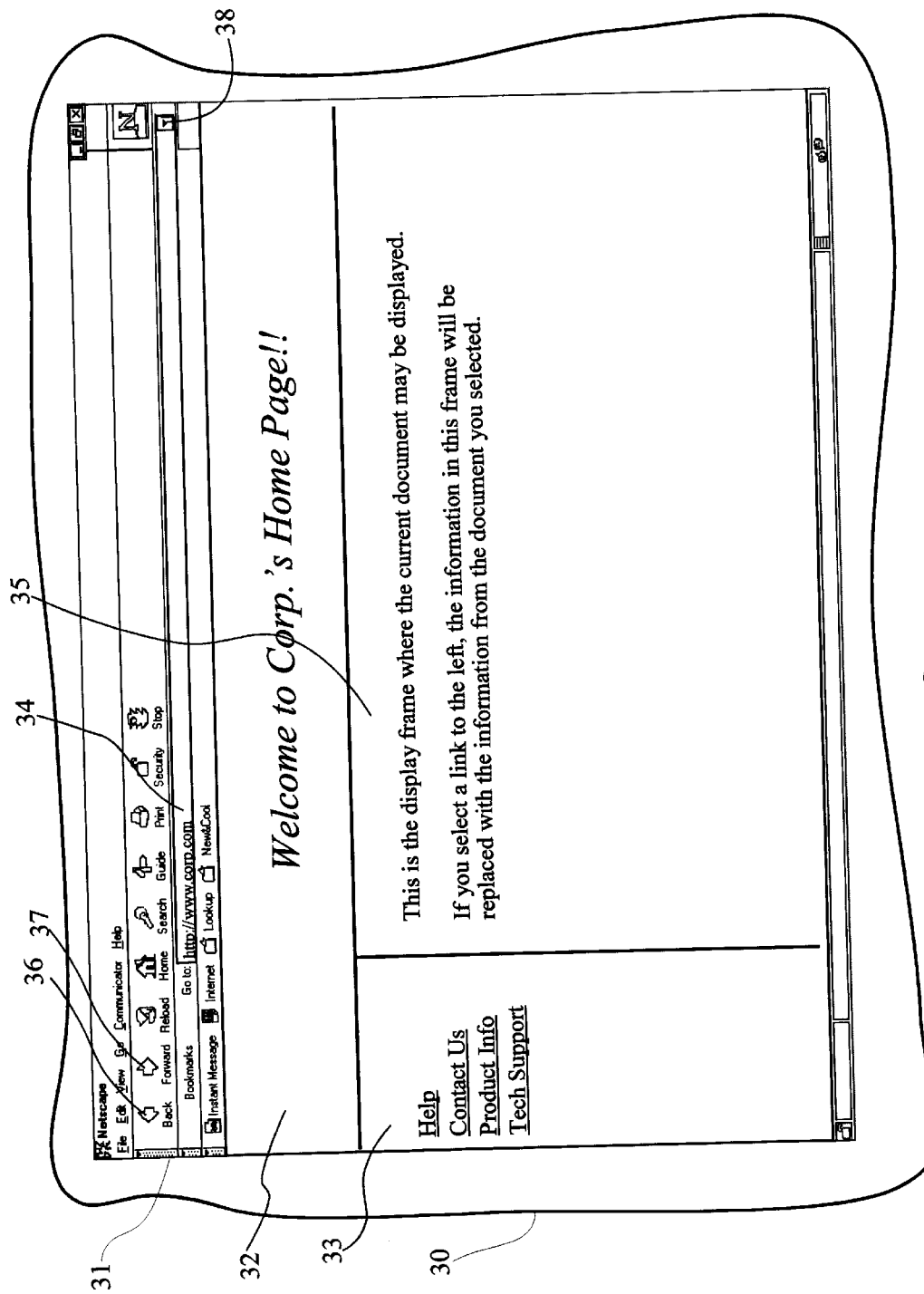
FIG. 3 illustrates an example of display in a typical web browser graphical interface window
Figure 4:
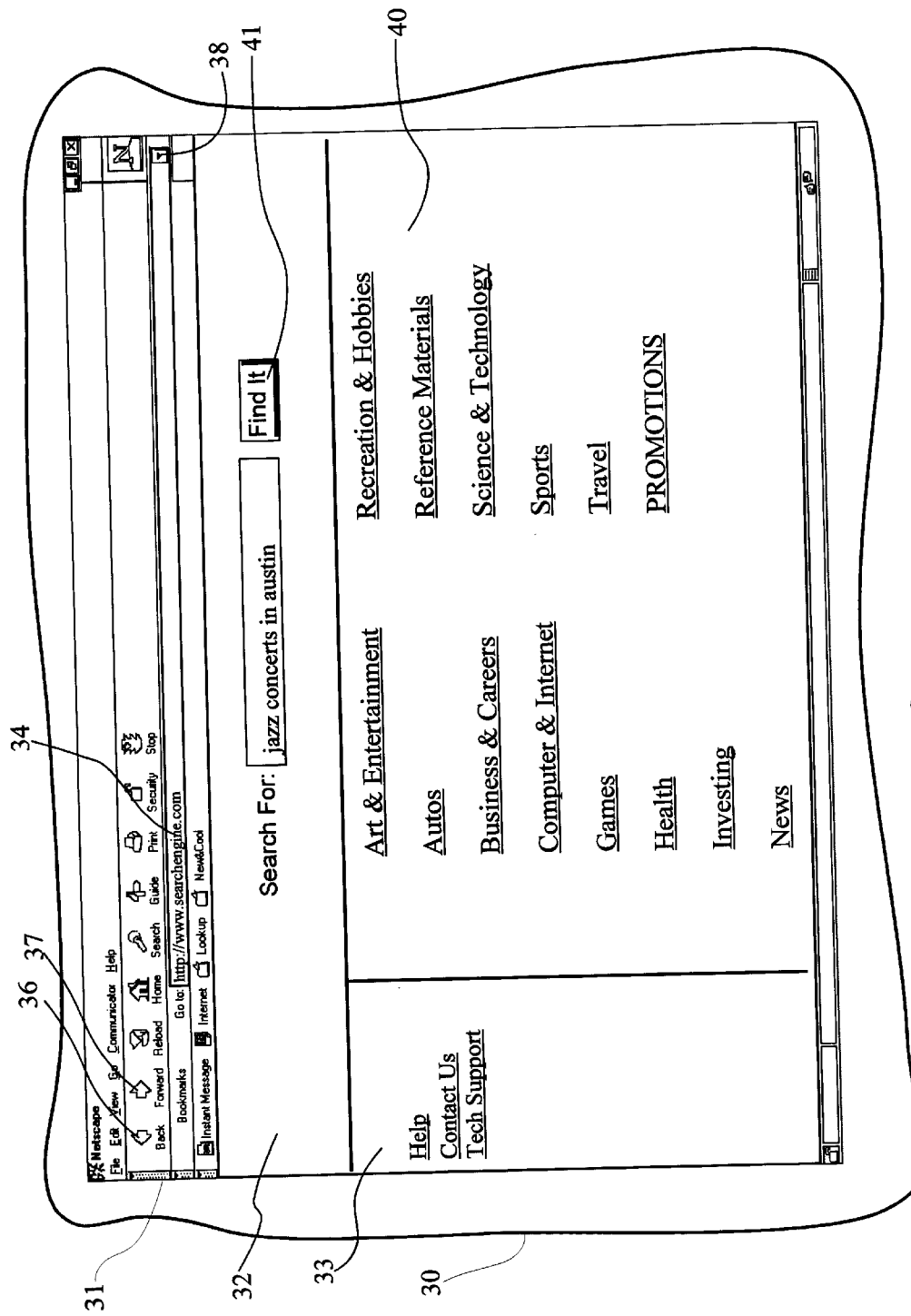
FIG. 4 shows a beginning of a hypothetical web browsing session based on a search engine.
Figure 5:
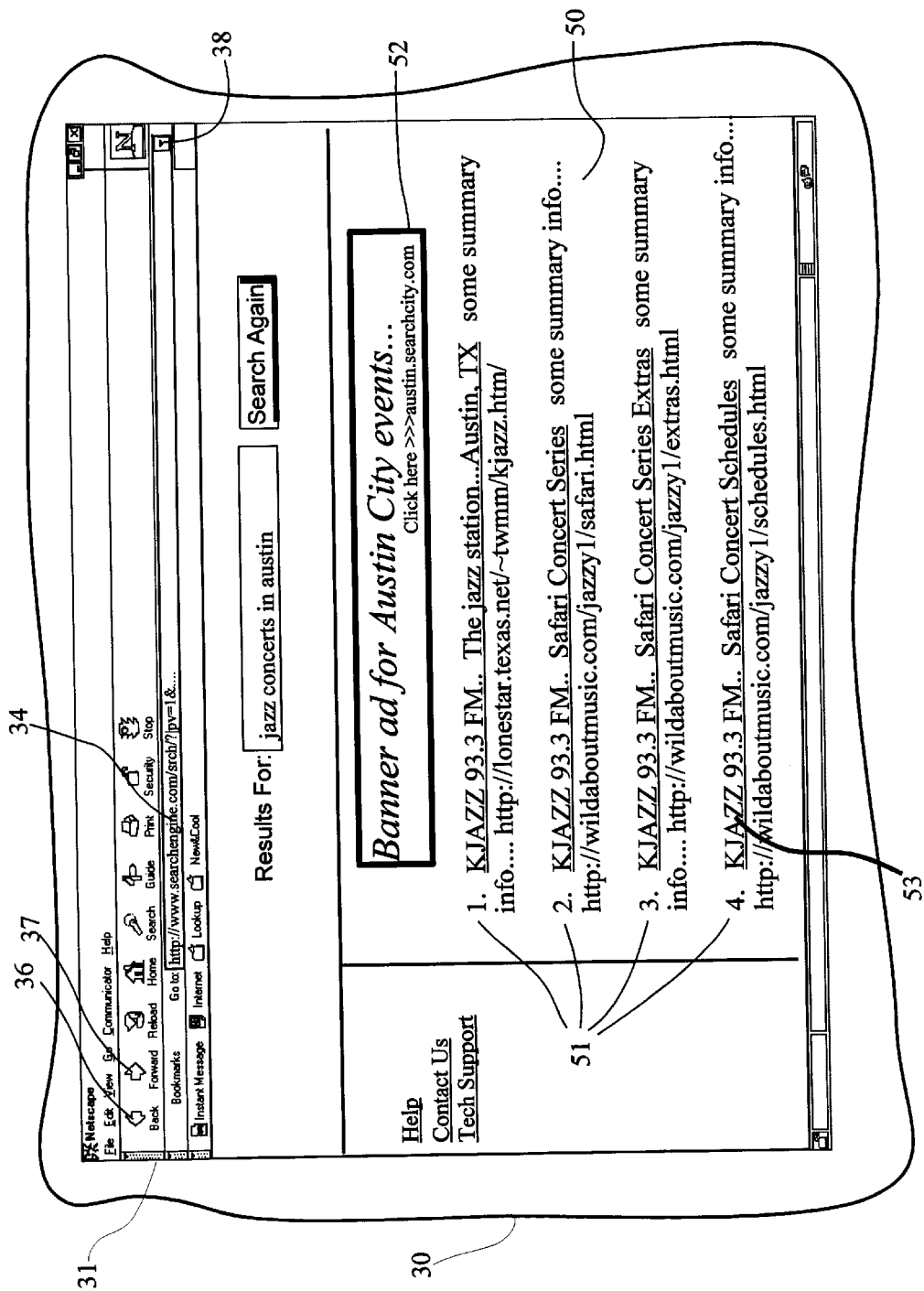
FIGS. 5, 6, and 7 show various possible advancements in the hypothetical web browsing session based upon search results.
Figure 6:
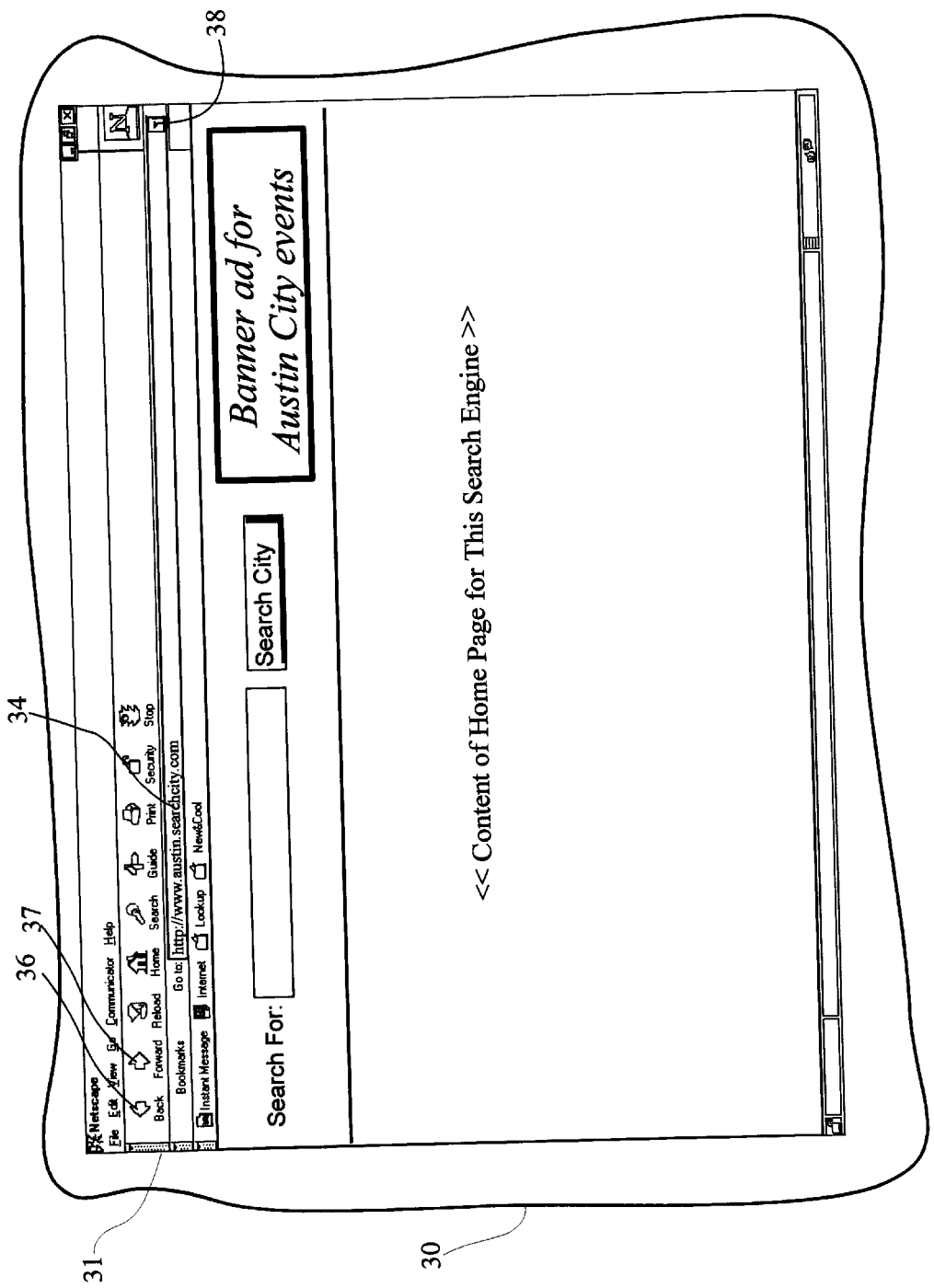
Figure 7:
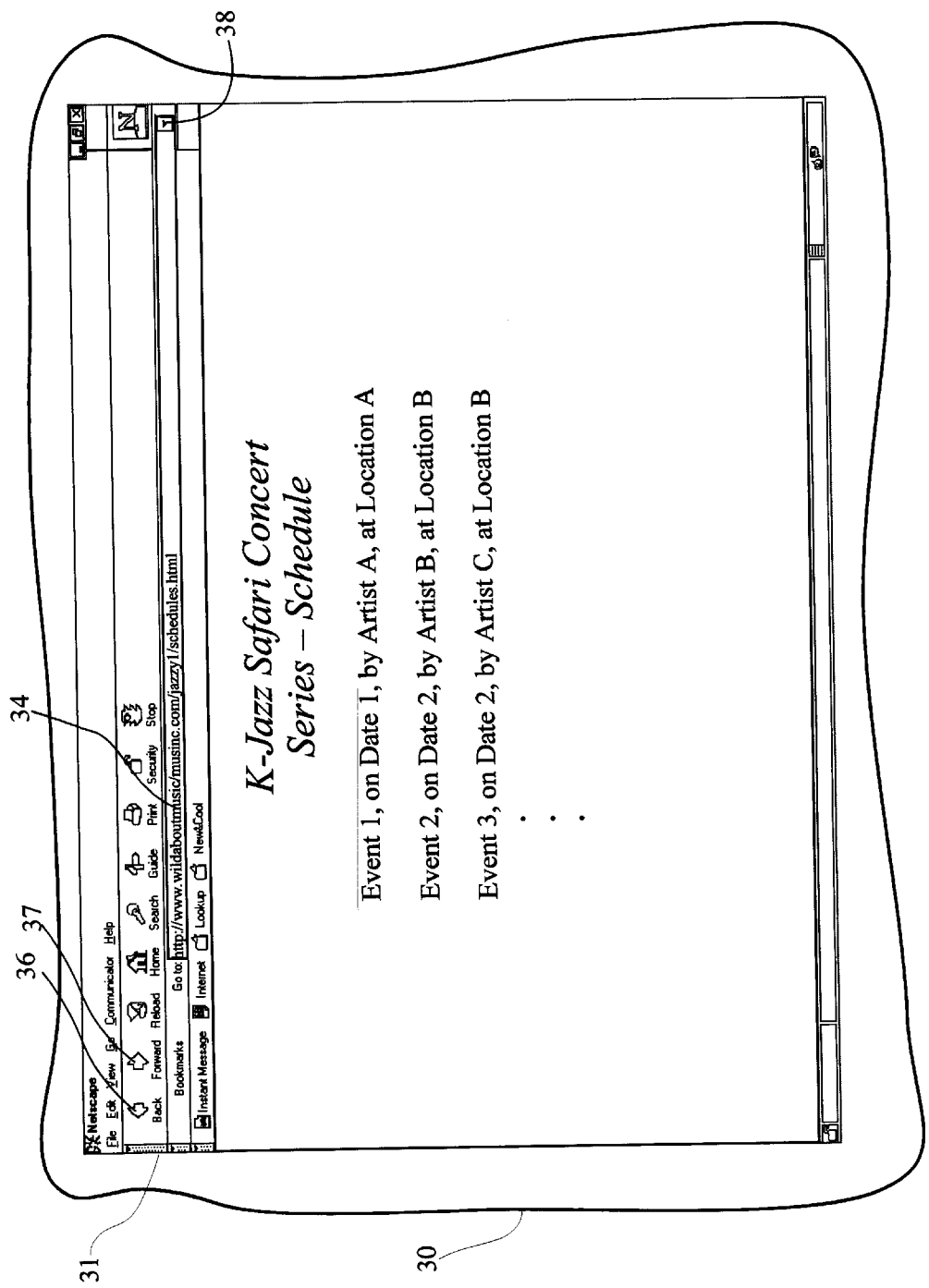

The foregoing and other objects, features and advantages of the invention will be apparent from the following more particular description of a preferred embodiment of the invention, as illustrated in the accompanying drawings wherein like reference numbers represent like parts of the invention.

A standard web browser software package is modified to include a new set of controls, page image rendering and history logging functions. The standard web browser functionality already has the capability to receive and interpret HTML and other standard web documents, and to create and sort history logs, and to automatically point to URL's and addresses contained within the history log.

Using a variety of prior art and new graphical user interface controls, such as sliders, spinners, infinite spin lists, and rubber-banded controls, the user is allowed to visually review previous browsing sessions and browsing history. As web sites are visited during a normal browsing session, images of the pages viewed are rendered and stored in the system's memory on the system disk, and are keyed to entries in the web browser's history log. In the preferred embodiment, the images are stored in cache, which allows for quicker retrieval, and are written to system non-volatile memory, such as a hard drive, prior to system shut down or when the cache is full. When the web browser user selects the visual history review tool, such as a graduated slider control, he or she may move the control forward or backward "in time" as the rendered images are displayed in a viewing window, along with optional information such as the originating web site for each address. The user may stop the control at a position in history, and select to re-point the browser to the web address selected from the history file. Thus, the user may visually browse back and forth through the history of web browser until he or she finds the page desired, and then jump to that page on the web.

A set of user preferences determines how the browsing history is recorded and how it is "replayed". The new controls also include a preference to retain in web browser cache raw web objects, such as HTML and GIF files, or to render full-size or thumbnail graphic composites of each page visited. Another user preference control available in the invention allows a user to replay the sequence of visitations using a linear GUI control object, such as a graduated slider bar, a radio knob or "spinner", or lists such as drop-down lists or infinite spin lists, as described in the related applications. Yet another user preference selects between display of the captured history pages in a pop-up window or within a full-size frame. And, a further user option allows for user definition of sorting of the history log, and consequently selection of the replay sequence of the history, by such parameters as most recent to oldest, most often to least often, and/or filtering parameters such as top-level domains only.

DETAILED DESCRIPTION OF THE INVENTION

The invention is preferably realized as software and functionality modifications to an existing web browser software package, such as Netscape's Navigator web browser, running on a suitable web browser computing platform, such as a personal computer running Microsoft Windows or the Linux operating system.

Figure 8:
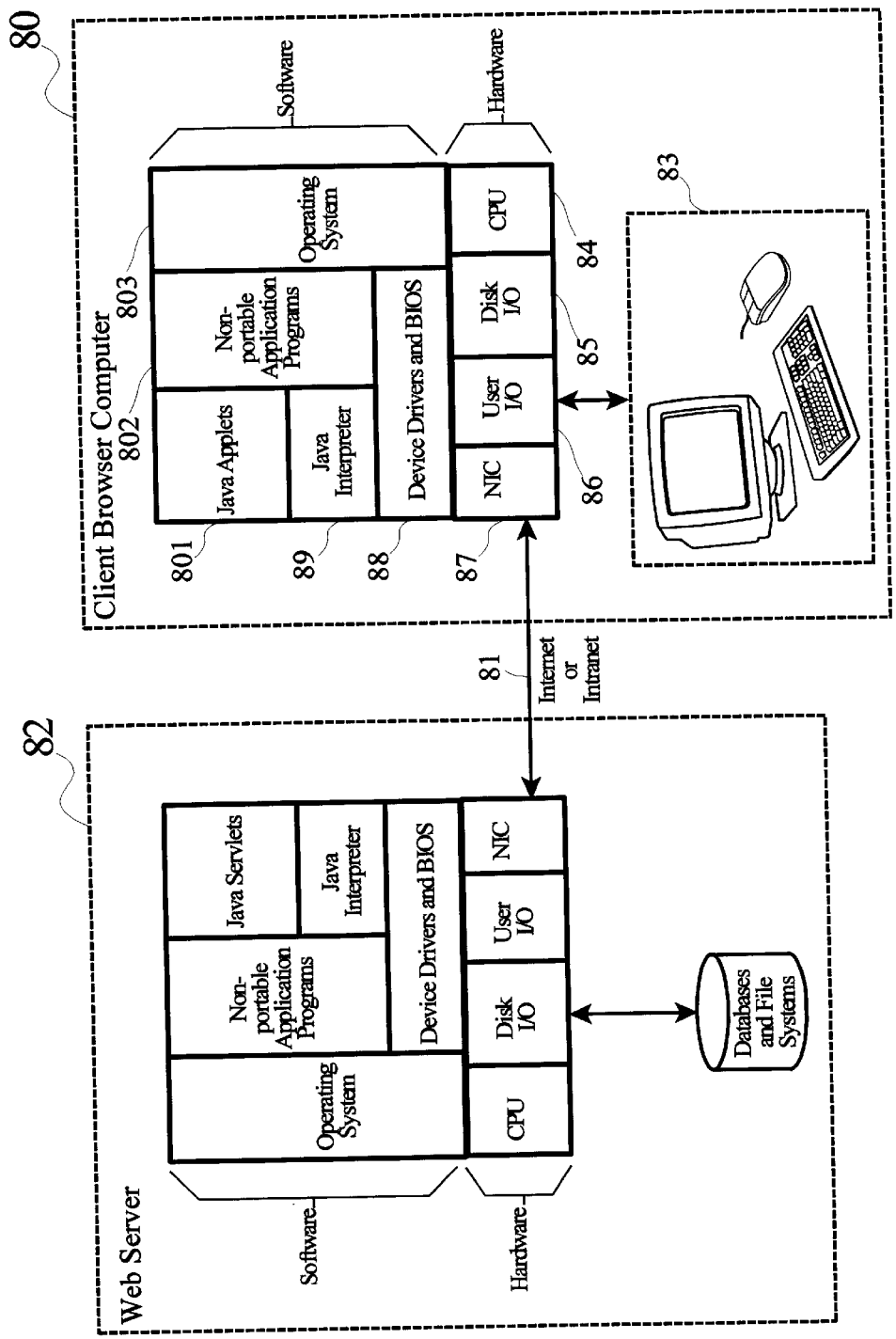
FIG. 8 depicts the architectural organization of web server and web browser system hardware and software in the prior art.

For reference, FIG. 8 shows the hardware and software architectures of typical web servers and web browser computer systems. A web browser computer (80) is communicatively interconnected via an Internet or intranet (81) to a web server computer (82). The web browser comprises standard user interface devices (83) such as a computer display or monitor, keyboard, and mouse. The web browser computer (80) hardware platform comprises a central processor ("CPU") (84), disk drives (85), user interface device I/O (86), and network interface card ("NIC") (87). The NIC may be one of several varieties well known within the art, including a dial-up modem, local area network ("LAN") card, or cable modem interface. The software executed by the web browser computer (80) may include device drivers and a basic input/output system ("BIOS") (88), and operating system (803), application programs (802), and an applet interpreter (89) and applets (801). A web browser program, such as Netscape's Navigator, is an application program which can be executed by the CPU (84). This architecture and arrangement with a web server computer is well known within the art.

In the preferred embodiment, a standard web browser application software program, Netscape Navigator, is modified to include certain logical and functional enhancements, either through software code changes within the browser itself or through software extension such as "plug-ins". Other popular web browser software may be adapted to realize the invention, as well, such as Microsoft's Internet Explorer, as most web browsers provide the fundamental functionality required to be coupled with the enhancements.

The functional enhancements utilize several existing capabilities of an existing web browser, such as the abilities to:

(1) interpret received web documents;

(2) cause all or part of a web document to be displayed in the current web browser display window;

(3) display user option icons, drop down lists or other mode control indicators in the web browser display window ("GUI controls");

(4) receive user selections of user option icons, drop down lists and other mode control indicators in the web browser display window;

(5) receive, parse and analyze the web address selected by the web browser user; and (6) create, sort, and modify a history log containing time-stamped document web addresses, captured data from the documents (such as a title field), and to record other system-specified information.

The additional functions to be added to the web browser to realize the invention are described infra, accompanied by figures and diagrams as necessary to enable one ordinarily skilled in the art to realize the invention. Certain implementation preferences, such as the use of a particular programming language or methodology, may be disclosed, but unless otherwise noted, such preferences are not critical to the realization of the invention and remain within the skill of the individual to select alternate choices more appropriate for compatibility with integration to a particular web browser. For example, the invention could be realized as a browser plug-in for a particular browser which allows plug-ins to access the browser history log. In such a case, it is within the skill of those in the art to select a programming language suitable for developing a plug-in. Alternatively, the invention may be implemented as a Java applet which could be distributed and/or downloaded.

A variety of user GUI control tools well-known within the art may be used as the user control for the linear history view, such as up/down buttons, drop-down lists, or slider bars. The related applications further disclosed new and enhanced user GUI controls, such as infinite spinlists with preview and postview lists, infinite spinner controls (radio knobs), virtual joystick, rubber-banding control of a GUI control, and "fixed slider" controls. Any of these types of controls are suitable for user control of the history viewer, and in the preferred embodiment, are selectable by the user as a preference setting.

Thus, the following descriptions are disclosed on a function-by-function basis, and in relationship to their interaction with each other, the user, and the base web browser.

Page Composite Image Rendering

Figure 9:
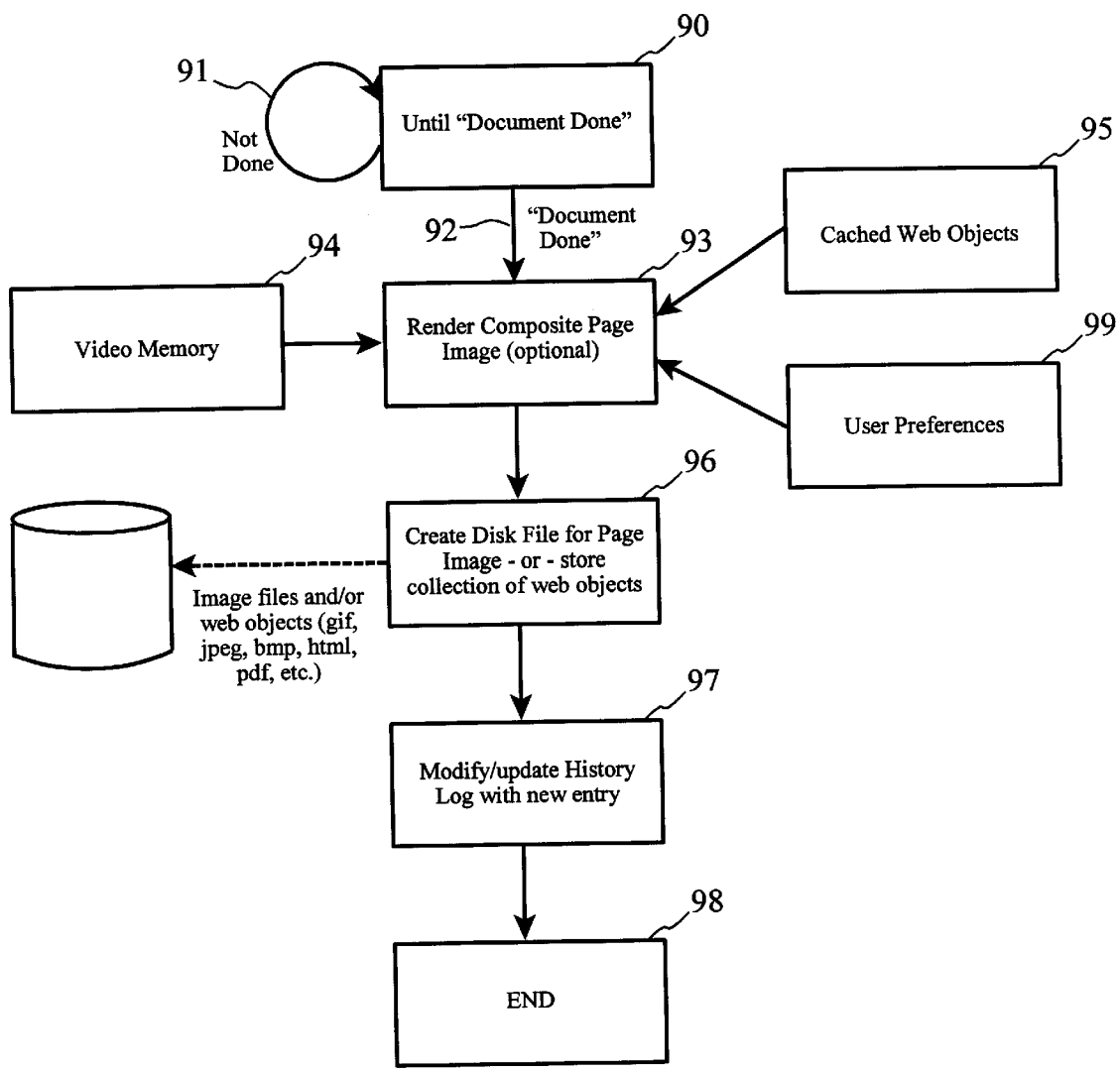
FIG. 9 sets forth the logical flow of the page rendering function of the invention.

In order facilitate faster replay of the sequence of previously visited web pages and sites, a function is added to the web browser which copies the currently displayed image to a cache, system memory, or graphic file on disk, depending on the system's available resources. FIG. 9 shows the basic logical flow of this function. Each time a new document is "visited" or retrieved, either by the user selecting a hyperlink or manually entering an address in the location bar, the browser executes the page rendering function after the page and all of its referenced web objects are downloaded. When the document has completed downloading (92), referred to as "document done", an image for the composite web page, including all overlays of graphic images, rendering (93) of page defined objects such as colors, borders, etc., is done. In it's simplest form, the rendering may be done by reading or otherwise accessing computer video memory for the contents of the web browser window display. Native operating system functions, such as Microsoft's Windows "Print Screen" function, may be used to indirectly access a bitmap of the video memory for an a selected window, or custom software may be developed which accesses the contents of video memory in the system. Images may be reduced to "thumbnail" images, which further supports quick replay and reduces disk storage requirements.

In a more advanced and computationally intensive implementation, the image may be rendered by processing all of the image objects and page source code into a new image bitmap, using the same or similar functions which the web browser uses. This alternative technique may result in better image quality for thumbnails (reduced frame) images, or may be adapted to support display resolutions and sizes beyond the particular unit on the current computer (this supports portability of the image and session history).

Then, the rendered image data is stored (96) in a file in the browser computer's persistent memory, such as a computer hard drive or battery-backed RAM. In the preferred embodiment, a standard image file format is used, such as GIF or JPEG, which lends the implementation to easier design by those skilled in the art.

Finally, the entry in the history log which corresponds to the current page being viewed is modified to indicate the name and location of the rendered image file.

New user preferences (99) configurable by the user include the choice to store full-screen or thumbnail views, the folder or directory in which to store images, and preferably maximum file sizes to be stored.

GUI Control to Visually Review the History Log

Figure 10:
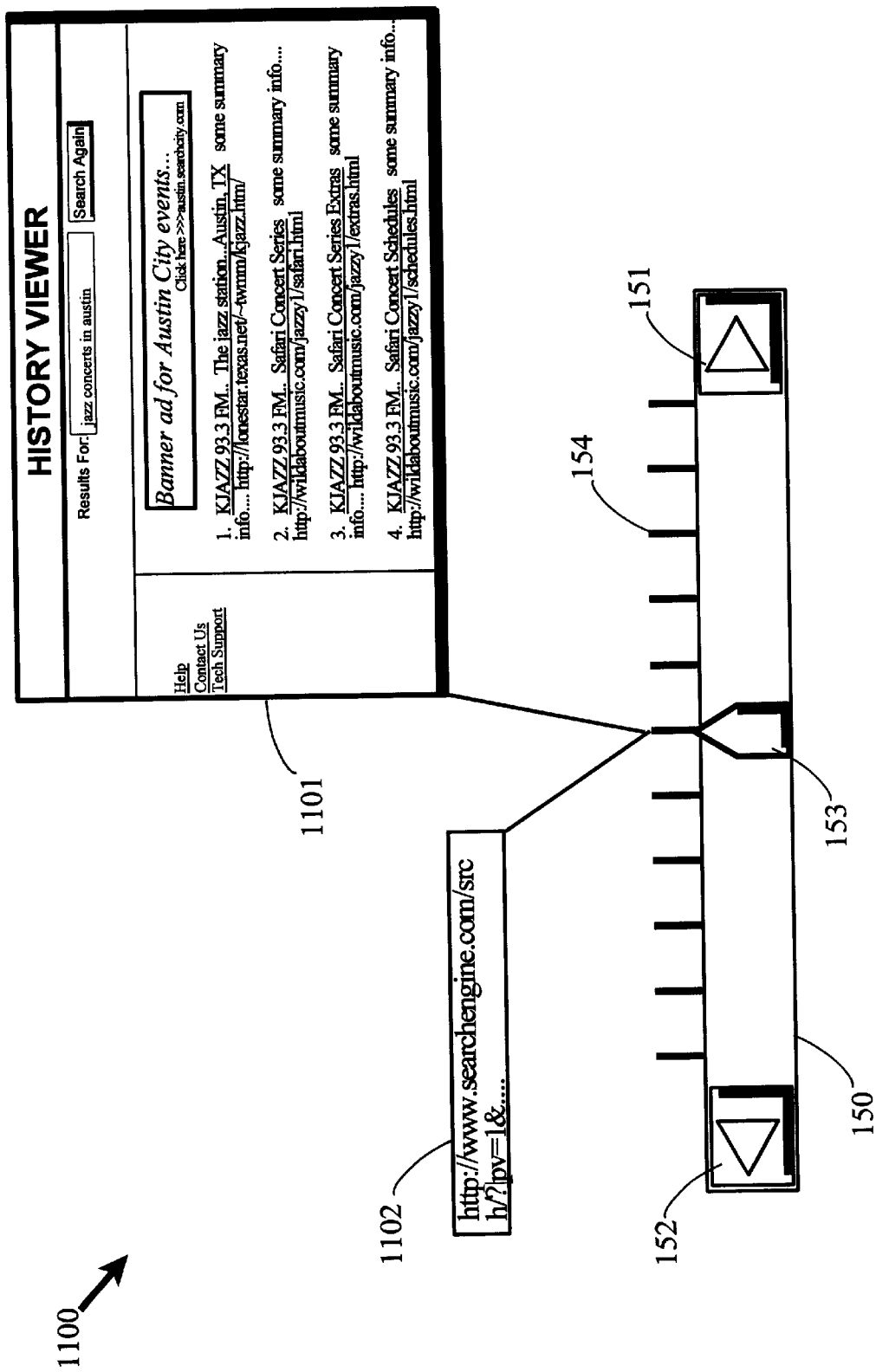
FIG. 10 discloses the history viewer with the pop-up thumbnail image window, a location prompt, and a graduated slider control.
Figure 11:
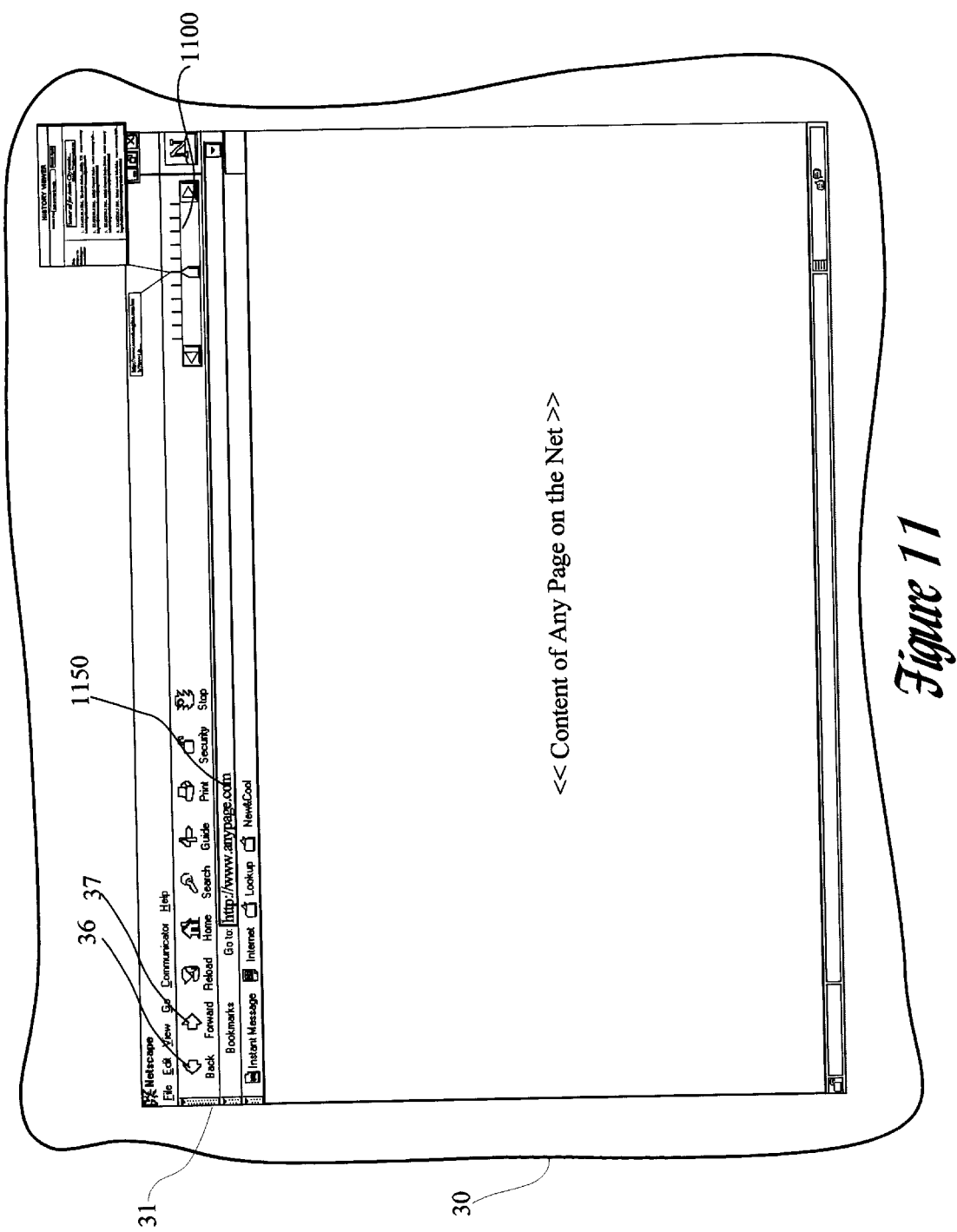
FIG. 11 shows the history viewer in operation on the main GUI display of a web browser.

FIG. 10 shows a close-up view of the history viewer (1100) with a graduated slider (150) as the control. The graduation marks (154) on the slider assist the user in moving one or more views forward or backward in the history log. The slider control may include a forward or next button (151) and a back or previous button (152). Also, the control may have a position selector and indicator (153), which is moved by "grabbing" or "dragging" it with a mouse or the pointer device. "Dragging" such controls includes placing a mouse or pointer over the item, clicking and holding a mouse button, and moving the mouse to cause the GUI control to move. The graduation marks may be above, below, on, or around the positional selector and indicator. Use of the rubber-banding method described in the related application is highly useful in this application. The slider control may be alternately replaced with a drop-down list, a spinner knob, an infinite spinner, an infinite spin list with or without preview/postview lists, some of which are well known in the art and some of which are described in the related applications. The history viewer (1100) in this view includes the optional thumbnail history page viewer (1101) "pop-up" window, along with a position information display (1102) which shows the page title and or originating address. The history viewer is shown on a web browser main GUI display (31) in FIG. 11.

The user may move the control to a position within the history log where a desired previously visited page is displayed, and then activate a "go to" control to re-point the browser to that address, thereby retrieving a fresh copy of the page. In the preferred embodiment, this is simply done by releasing or "dropping" the slider control at the desired position, and pointing with the mouse to the displayed thumbnail, and clicking on the thumbnail. Other options to activate the "go to" control include dragging and dropping the position information display into the main web browser window, dragging and dropping the address display into the location bar, or simply double clicking on the positional control or address display.

The order of display of the page images may be from oldest to newest, or by any other sorting criteria available in the normal history log viewer, such as alphabetically by domain name. Preferably, when the positional indicator is not selected or "grabbed" by the mouse, the thumbnail history page viewer (1101) and position information display (1102) are removed so that the normal browser toolbar below may be viewed and used.

Figure 12:
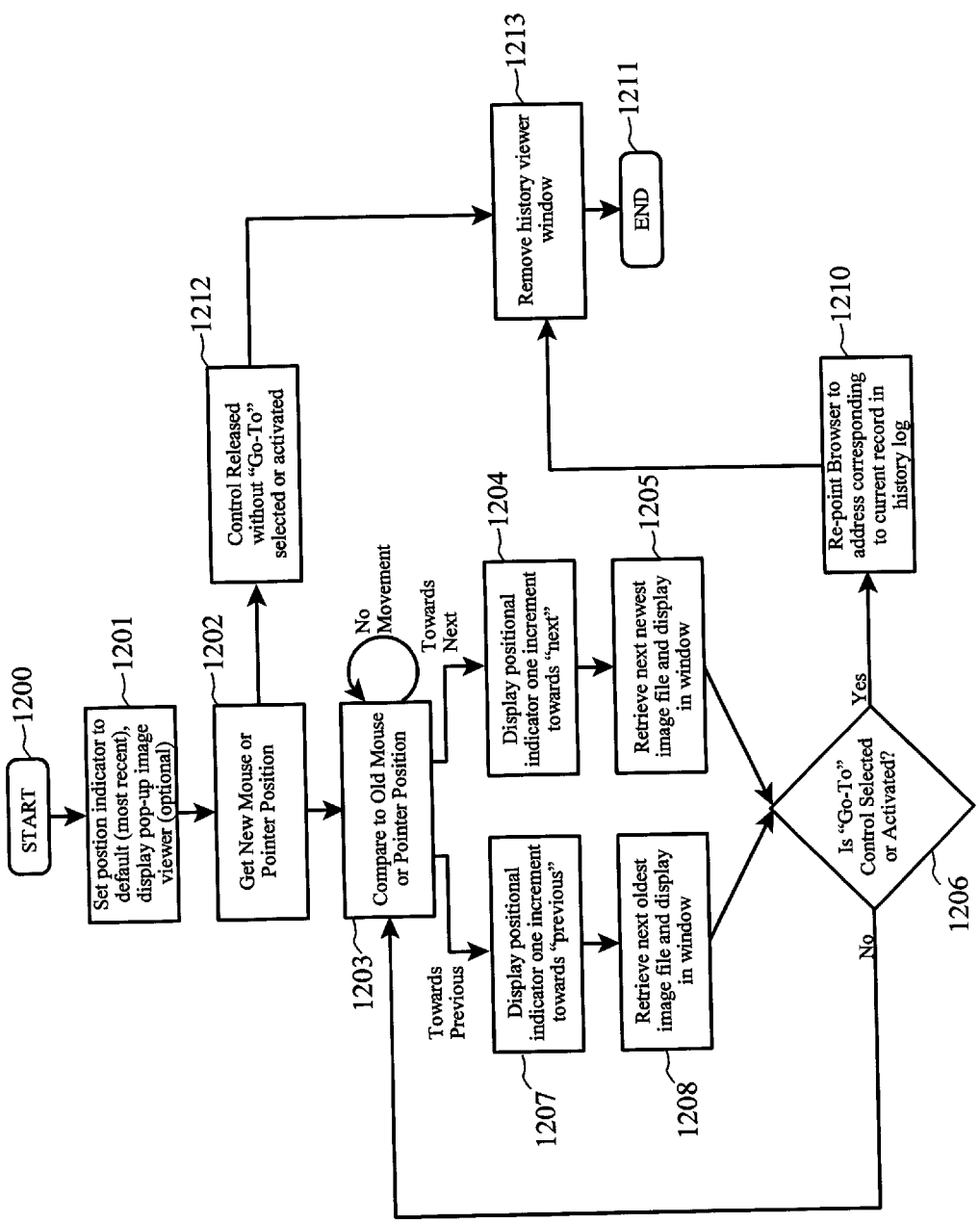
FIG. 12 discloses the logical flow of the history viewer function.

FIG. 12 shows the logical flow of the history viewer function. When the web browser software detects that the user has grabbed the history viewer control, the history viewer function is executed (1200). First, the positional indicator, such as the slider pointer or radio knob, is set (1201) to the most recent graduation mark or the current page, and the pop-up page image viewer (or full-size frame) with position information display is displayed on the top of layer of the GUI display. The page image viewer initially contains the rendered thumbnail image (or full-size image) of the current page, and the optional position information display (1102) contains the document source address and title. When the mouse or pointer is moved (1202), the new position is compared to the previous pointer position. If (1203) the pointer movement is towards the "most recent" extreme of the slider or rotational control, the positional indicator control is moved to the next most recent graduation mark (1204), and the next more recent record from the history log is retrieved. The image file is retrieved associated with this record, the image is displayed in the image viewer, and the position information display is updated to show the associated document title and source address (1205).

Next, the Go-To control is checked (1206) to see if it is activated, such as double-clicking on the image viewer, and if it is selected, the web browser is re-pointed to the selected source address, the pop-up image viewer and position information display are removed from the GUI display (1213), and normal browsing is resumed (1211). If pointer movement towards the opposite extreme of the control is detected, the positional indicator is moved to the next least recent graduation mark, the next least recent record in the history log is retrieved, the associated page image file is retrieved and displayed and the position control has been "dropped" (1212) without activating the Go-To control, the pop-up image viewer and position information display are removed from the GUI display (1213), and normal browsing is resumed (1211).

Web Browser Control Loop

Figure 13:
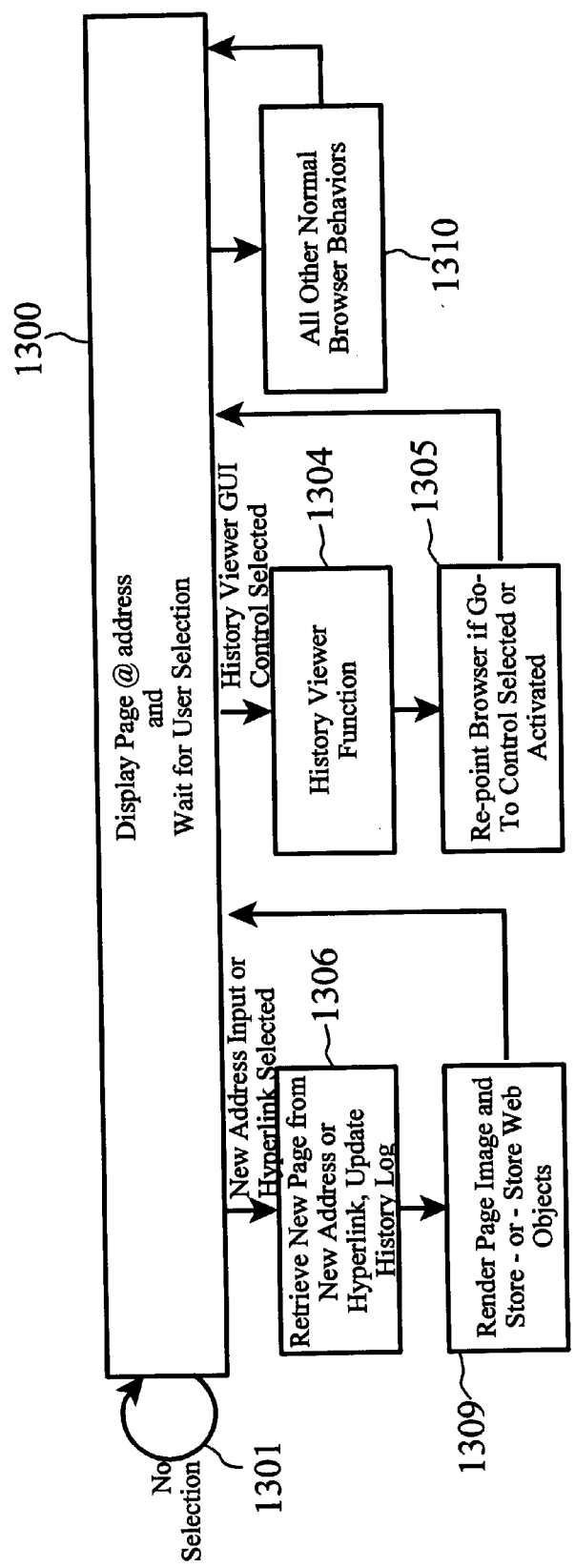
FIG. 13 illustrates the embodiment of the invention into a standard web browser.

FIG. 13 shows a high-level control loop for a modified web browser (1300), and modifications or additions to it necessary to realize the invention. Integration of the previously described functions may be achieved in a variety of ways to realize the invention, and as such, FIG. 13 is given for purpose of demonstration and explanation. In the preferred embodiment, the additional functionality disclosed is included in the software of the browser, but it may be alternately included as an extension or "plug-in" to the browser.

Normally, the basic web browser (1300) is displaying a previously retrieved document. While there are no new, unprocessed selections by the user (1301), the current page remains displayed. If the user re-points the browser or selects a hyperlink in the current page, the browser retrieves the selected page and updates the history log (1306) normally, but then executes the page rendering function (1309). This causes the otherwise normal history log to be updated to include additional parameters with each record, such as the name of the rendered page image file and its location. Then, normal browsing is resumed. When the web browser detects that the user has selected or "grabbed" the history viewer control, the history viewer function is executed (1304) until it normally ends with re-pointing the web browser or returning to browsing without re-pointing. All other behaviors (1310) of the browser are left unchanged with respect to this invention.

Enhanced History Log

TABLE 2 shows a modified history log in which the existing history log is expanded to include fields in each record for the rendered page image file path and name.

TABLE 2

Enhanced Session History Log (a) http://www.wildaboutmusic.com/jazzy1/schedules.html, 1:04 PM, TITLE = "J-Jazz 93.3 Jazz Safari Concert Schedules", BLIT = "c:\visualhistory\jazz_in_austin\005.gif"
(b) http://www.lycos.com/srch/?lpv=1&loc=searchhp&query=jazz+concerts+austin&x=34&y=8; 1:03 PM, TITLE = "Search for 'jazz concerts austin'", BLIT = "c:\visualhistory\jazz_in_austin\004.gif"
(c) http://austin.citysearch.com/?csad=lycadddsw, 1:02 PM, TITLE= "CitySearch:Austin", BLIT="c:\visualhistory\jazz_in_austin\003.gif"
(d) http://www.lycos.com/srch/?lpv=1&loc=searchhp&query=jazz+concerts+austin&x=34&y8; 1:01 PM, TITLE = "Search for "jazz concerts austin", BLIT = "c:\visualhistory\jazz_in_austin\002.gif"
(e) http://www.lycos.com/, 1:00 PM, TITLE="Lycos", BLIT = "c:\visualhistory\jazz_in_austin\001.gif"

In the embodiment of the history log shown in TABLE 2, each record of the history log is modified to include a BLIT parameter indicating the names and locations of the rendered image "screen shot" files. In this example, four image files, 001.GIF, 002.GIF, 003.GIF, 004.GIF, and 005.GIF are with the previously visited addresses of (e), (d), (c), (b), and (a), in that time-related sequence.

SUMMARY

Certain enhancements and changes to commonly known web browser systems have been disclosed in terms of modification of existing web browser software running on well-known web browser computer platforms, allow a web browser user to visually replay and review previously recorded web browsing sessions, and to optionally return to those pages or refresh those pages.

It will be understood from the foregoing description that various modifications and changes may be made in the preferred embodiment of the present invention without departing from its true spirit, such as the use of alternate programming methodologies or languages, alternate web browser platforms and software, operating systems and user control objects. It is intended that this description is for purposes of illustration only and should not be construed in a limiting sense. The scope of this invention should be limited only by the language of the following claims.

What is claimed is:

1. A method for reviewing and displaying a visual history of a web browsing session on a user's computer, said web browsing session comprising one or more visits to Internet or intranet sites or pages, said computer having a processor capable of executing web browser software, one or more user input devices, a display, a linear history log, and one or more visual objects stored in computer readable media, said linear history log containing entries which relate visits to locations of stored visual objects, said method comprising the steps of:

providing a user-operable slider-type graphical user control on said computer display, selectable and operable using said user input device;

retrieving one or more visual objects from their locations in computer readable media according to entries in said history log in a predetermined order responsive to operation of said graphical user control; and displaying said visual objects one at a time in a single image viewer frame such that a user may view a predetermined sequence of individually displayed visual objects representing a recorded linear history of a web browsing session.

2. The method for reviewing and displaying a visual history of a web browsing session on a user's computer as set forth in claim 1 wherein said step of providing a slider-type graphical user control further comprises providing a slider control with graduations for indicating a relative position within the predetermined sequence.

3. The method for reviewing and displaying a visual history of a web browsing session on a user's computer as set forth in claim 1 wherein said step of retrieving visual objects responsive to operation of a graphical user control further comprises providing a spinner or radio-knob type of graphical user control.

4. The method for reviewing and displaying a visual history of a web browsing session on a user's computer as set forth in claim 3 wherein said step of providing a spinner or radio-knob type of graphical user control further comprises providing an infinite spinner type of graphical user control.

5. The method for reviewing and displaying a visual history of a web browsing session on a user's computer as set forth in claim 1 wherein said step of retrieving visual objects responsive to operation of a graphical user control further comprises providing a list type of graphical user control.

6. The method for reviewing and displaying a visual history of a web browsing session on a user's computer as set forth in claim 5 wherein said step of providing a list type of graphical user control further comprises providing a drop-down list graphical user control.

7. The method for reviewing and displaying a visual history of a web browsing session on a user's computer as set forth in claim 6 wherein said step of providing a list type of graphical user control further comprises providing a list graphical user control having preview and postview lists.

8. The method for reviewing and displaying a visual history of a web browsing session on a user's computer as set forth in claim 1 wherein said step off retrieving visual objects responsive to operation of a graphical user control further comprises providing a graphical user control with rubber-banding control.

9. The method for reviewing and displaying a visual history of a web browsing session on a user's computer as set forth in claim 1 wherein said step of retrieving visual objects responsive to operation of a graphical user control further comprises providing a user-operable preference setting allowing selection of the type of graphical user control provided.

10. The method for reviewing and displaying a visual history of a web browsing session on a user's computer as set forth in claim 1 wherein said step of retrieving visual objects from their locations in a predetermined order is performed in a time-relative order.

11. The method for reviewing and displaying a visual history of a web browsing session on a user's computer as set forth in claim 1 wherein said step of retrieving visual objects from their locations in a predetermined order is performed in a frequency-of-visit based order.

12. The method for reviewing and displaying a visual history of a web browsing session on a user's computer as set forth in claim 1 wherein said step of retrieving visual objects from their locations in a predetermined order is performed in an order relative to a web address to which cach visit was originally made.

13. The method for reviewing and displaying a visual history of a web browsing session on a user's computer as set forth in claim 1 wherein said step of retrieving visual objects from their locations in a predetermined order further comprises providing a user-operable preference setting allowing selection of the predetermined order.

14. The method for reviewing and displaying a visual history of a web browsing session on a user's computer as set forth in claim 1 wherein said step of displaying said visual objects further comprises providing a pop-up window in which said retrieved visual objects are displayed.

15. The method for reviewing and displaying a visual history of a web browsing session on a user's computer as set forth in claim 1 wherein said step of displaying said visual objects further comprises displaying a web object in reduced or "thumbnail" format.

16. The method for reviewing and displaying a visual history of a web browsing session on a user's computer as set forth in claim 1 wherein said step of displaying said visual object further comprises displaying composite image visual objects.

17. The method for reviewing and displaying a visual history of a web browsing session on a user's computer as set forth in claim 1 wherein said step of displaying said visual objects further comprises displaying web objects.

18. The method for reviewing and displaying a visual history of a web browsing session on a user's computer as set forth in claim 1 wherein said step of displaying said visual objects further comprises displaying information from said history log entry corresponding to a visual object being displayed.

19. The method for reviewing and displaying a visual history of a web browsing session on a user's computer as set forth in claim 18 wherein said step of displaying a information from said history log entry corresponding to a visual object being displayed further comprises displaying a web address to which a visit was originally made.

20. The method for reviewing and displaying a visual history of a web browsing session on a user's computer as set forth in claim 18 wherein said step of displaying information from said history log entry corresponding to a visual object being displayed further comprises displaying a time indicator when a visit was originally made.

21. The method for reviewing and displaying a visual history of a web browsing session on a user's computer as set forth in claim 1 wherein said step of displaying said visual objects further comprises providing a user-operable preference setting allowing selection and control of the type of display provided.

22. The method for reviewing and displaying a visual history of a web browsing session on a user's computer as set forth in claim 18 wherein said step of displaying information from said history log entry corresponding to a visual object being displayed further comprises providing a user-operable preference setting allowing selection and control of the type of history log information to be displayed.

23. A computer-readable storage medium having stored therein computer-readable program code for reviewing and displaying a visual linear history of a web browsing session on a user's computer, said web browsing session comprising one or more visits to Internet or intranet sites or pages, said computer having a processor capable of executing web browser software, one or more user input devices, a display, a linear history log, and one or more visual objects stored in computer readable media, said linear history log containing entries which relate visits to locations of said stored visual objects, wherein the program code when executed by the processor causes the processor to perform the steps of:

providing a user-operable slider-type graphical user control on said computer display, selectable and operable using said user input device;

retrieving one or more visual objects from their locations in computer readable media according to entries in said linear history log in a predetermined order responsive to operation of said graphical user control; and displaying said visual objects one at a time in a linear history viewer window such that a user may view a predetermined sequence of individually displayed visual objects representing a recorded linear history of a web browsing session.

24. The computer-readable storage medium having stored therein computer-readable program code for reviewing and displaying a visual history of a web browsing session on a user's computer as set forth in claim 23 wherein said step of providing a slider-type graphical user control further comprises providing a slider control with graduations for indicating a relative position within the predetermined sequence.

25. The computer-readable storage medium having stored therein computer-readable program code for reviewing and displaying a visual history of a web browsing session on a user's computer as set forth in claim 23 wherein said step of retrieving visual objects responsive to operation of a graphical user control further comprises providing a spinner or radio-knob type of graphical user control.

26. The computer-readable storage medium having stored therein computer-readable program code for reviewing and displaying a visual history of a web browsing session on a user's computer as set forth in claim 25 wherein said step of providing a spinner or radio-knob type of graphical user control further comprises providing an infinite spinner type of graphical user control.

27. The computer-readable storage medium having stored therein computer-readable program code for reviewing and displaying a visual history of a web browsing session in a user's computer as set forth in claim 23 wherein said step of retrieving visual objects responsive to operation of a graphical user control further comprises providing a list type of graphical user control.

28. The computer-readable storage medium having stored therein computer-readable program code for reviewing and displaying a visual history of a web browsing session on a user's computer as set forth in claim 27 wherein said step of providing a list type or graphical user control further comprises providing a drop-down list graphical user control.

29. The computer-readable storage medium having stored therein computer-readable program code for reviewing and displaying a visual history of a web browsing session on a user's computer as set forth in claim 28 wherein said step of providing a list type of graphical user control further comprises providing a list graphical user control having preview and postview lists.

30. The computer-readable storage medium having stored therein computer-readable program code for reviewing and displaying a visual history of a web browsing session on a user's computer as set forth in claim 23 wherein said step of retrieving visual objects responsive to operation of a graphical user control further comprises providing a graphical user control with rubber-banding control.

31. The computer-readable storage medium having stored therein computer-readable program code for reviewing and displaying a visual history of a web browsing session on a user's computer as set forth in claim 23 wherein said step of retrieving visual objects responsive to operation of a graphical user control further comprises providing a user-operable preference setting allowing selection of the type of graphical user control provided.

32. The computer-readable storage medium having stored therein computer-readable program code for reviewing and displaying a visual history of a web browsing session on a user's computer as set forth in claim 23 wherein said step of retrieving visual objects from their locations in a predetermined order is performed in a time-relative order.

33. The computer-readable storage medium having stored therein computer-readable program code for reviewing and displaying a visual history of a web browsing session on a user's computer as set forth in claim 23 wherein said step of retrieving visual objects from their locations in a predetermined order is performed in a frequency-of-visit based order.

34. The computer-readable storage medium having stored therein computer-readable program code for reviewing and displaying a visual history of a web browsing session on a user's computer as set forth in claim 23 wherein said step of retrieving visual objects from their locations in a predetermined order is performed in an order relative to a web address to which each visit was originally made.

35. The computer-readable storage medium having stored therein computer-readable program code for reviewing and displaying a visual history of a web browsing session on a user's computer as set forth in claim 23 wherein said step of retrieving visual objects from their locations in a predetermined order further comprises providing a user-operable preference setting allowing selection of the predetermined order.

36. The computer-readable storage medium having stored therein computer-readable program code for reviewing and displaying a visual history of a web browsing session on a user's computer as set forth in claim 23 wherein said step of displaying said visual objects further comprises providing a pop-up window in which said retrieved visual objects are displayed.

37. The computer-readable storage medium having stored therein computer-readable program code for reviewing and displaying a visual history of a web browsing session on a user's computer as set forth in claim 23 wherein said step of displaying said visual objects further comprises displaying a web object in reduced or "thumbnail" format.

38. The computer-readable storage medium having stored therein computer-readable program code for reviewing and displaying a visual history of a web browsing session on a user's computer as set forth in claim 23 wherein said step of displaying said visual objects further comprises displaying composite image visual objects.

39. The computer-readable storage medium having stored therein computer-readable program code for reviewing and displaying a visual history of a web browsing session on a user's computer as set forth in claim 23 wherein said step of displaying said visual objects further comprises displaying web objects.

40. The computer-readable storage medium having stored therein computer-readable program code for reviewing and displaying a visual history of a web browsing session on a user's computer as set forth in claim 23 wherein said step of displaying said visual objects further comprises displaying information from said history log entry corresponding to a visual object being displayed.

41. The computer-readable storage medium having stored therein computer-readable program code for reviewing and displaying a visual history of a web browsing session on a user's computer as set forth in claim 40 wherein said step of displaying a information from said history log entry corresponding to a visual object being displayed further comprises displaying a web address to which a visit was originally made.

42. The computer-readable storage medium having stored therein computer-readable program code for reviewing and displaying a visual history of a web browsing session on a user's computer as set forth in claim 40 wherein said step of displaying information from said history log entry corresponding to a visual object being displayed further comprises displaying a time indicator when a visit was originally made.

43. The computer-readable storage medium having stored therein computer-readable program code for reviewing and displaying a visual history of a web browsing session on a user's computer as set forth in claim 40 wherein said step of displaying said visual objects further comprises providing a user-operable preference setting allowing selection and control of the type of display provided.

44. The computer-readable storage medium having stored therein computer-readable program coe for reviewing and displaying a visual history of a web browsing session on a user's computer as set forth in claim 40 wherein said step of displaying information from said history log entry corresponding to a visual object being displayed further comprises providing a user-operable preference setting allowing selection and control of the type of history log information to be displayed.

45. A system for reviewing and displaying a visual linear history of a web browsing session on a user's computer, said web browsing session comprising one or more visits to Internet or intranet sites or pages, said computer having a processor capable of executing software, one or more user input devices, a display, a linear history log, and one or more visual objects stored in computer readable media, said linear history log containing entries which relate visits to locations of said stored visual objects, said system comprising:

a slider-type graphical user control on said computer display, selectable and operable using said user input device;

a visual object retrieving function for accessing and retrieving one or more stored visual objects from their locations in computer readable media according to entries in said linear history log in a predetermined order responsive to operation of said graphical user control; and a visual object display for displaying said retrieved visual objects one at a time on said computer display in a linear history viewer window, thereby allowing a user to view a predetermined linear sequence of individually displayed visual objects representing a recorded linear history of a web browsing session.

46. The system for reviewing and displaying a visual history of a web browsing session on a user's computer as set forth in claim 45 wherein said slider-type graphical user control further comprises a slider control with graduations for indicating a relative position within the predetermined sequence.

47. The system for reviewing and displaying a visual history of a web browsing session on a user's computer as set forth in claim 45 wherein said graphical user control on said computer display further comprises a spinner or radio-knob type of graphical user control.

48. The system for reviewing and displaying a visual history of a web browsing session on a user's computer as set forth in claim 47 wherein said spinner or radio-knob type of graphical user control further comprises an infinite spinner graphical user control.

49. The system for reviewing and displaying a visual history of a web browsing session on a user's computer as set forth in claim 45 wherein said graphical user control on said computer display further comprises a list type of graphical user control.

50. The system for reviewing and displaying a visual history of a web browsing session on a user's computer as set forth in claim 49 wherein said list type of graphical user control further comprises a drop-down list graphical user control.

51. The system for reviewing and displaying a visual history of a web browsing session on a user's computer as set forth in claim 49 wherein said list type of graphical user control on said computer display further comprises a list graphical user control having preview and postview lists.

52. The system for reviewing and displaying a visual history of a web browsing session on a user's computer as set forth in claim 45 wherein said graphical user control on said computer display further comprises a rubber-banding control.

53. The system for reviewing and displaying a visual history of a web browsing session on a user's computer as set forth in claim 45 further comprising a user-operable preference setting allowing selection of the type of graphical user control provided on said computer display.

54. The system for reviewing and displaying a visual history of a web browsing session on a user's computer as set forth in claim 45 wherein said visual object retrieving function is adapted to retrieve stored visual objects from their locations in a time-relative order.

55. The system for reviewing and displaying a visual history of a web browsing session on a user's computer as set forth in claim 45 wherein said visual object retrieving function is adapted to retrieve stored visual objects from their locations in a frequency-of-visit based order.

56. The system for reviewing and displaying a visual history of a web browsing session on a user's computer as set forth in claim 45 wherein said visual object retrieving function is adapted to retrieve stored visual objects from their locations in a order relative to a web address to which each visit was originally made.

57. The system for reviewing and displaying a visual history of a web browsing session on a user's computer as set forth in claim 45 further comprising a user-operable preference setting allowing selection and control of the predetermined order in which the visual object retrieving function operates.

58. The system for reviewing and displaying a visual history of a web browsing session on a user's computer as set forth in claim 45 wherein said visual object display further comprises a pop-up window in which said retrieved visual objects are displayed.

59. The system for reviewing and displaying a visual history of a web browsing session on a user's computer as set forth in claim 45 wherein said visual object display further comprises an information display containing information from said history log entry corresponding to a visual object being displayed.

60. The system for reviewing and displaying a visual history of a web browsing session on a user's computer as set forth in claim 59 wherein said information display contains a web address to which a visit was originally made.

61. The system for reviewing and displaying a visual history of a web browsing session on a user's computer as set forth in claim 59 wherein said information display contains a time indicator when a visit was originally made.

62. The system for reviewing and displaying a visual history of a web browsing session on a user's computer as set forth in claim 45 further comprising a user-operable preference setting allowing selection and control of the type of display provided.

63. The system for reviewing and displaying a visual history of a web browsing session on a user's computer as set forth in claim 59 further comprising a user-operable preference setting allowing selection and control of the type of history log information to be displayed.

\* \* \* \* \*

UNITED STATES PATENT AND TRADEMARK OFFICE
CERTIFICATE OF CORRECTION

PATENT NO. : 6,667,751 B1 Page 1 of 1
DATED : January 20, 2004
INVENTOR(S) : Wynn et al.

It is certified that error appears in the above-identified patent and that said Letters Patent is hereby corrected as shown below:

<u>Column 10,</u>
Line 9, change "control has been "dropped" to -- information display is updated (1207 and 1208). If it is detected that the position control has been "dropped" (1212) --

<u>Column 15,</u>
Line 62, change "coe" to -- code --

Signed and Sealed this

Twentieth Day of April, 2004

JON W. DUDAS
*Acting Director of the United States Patent and Trademark Office*